(12) United States Patent
Flugge

(10) Patent No.: US 11,516,764 B2
(45) Date of Patent: Nov. 29, 2022

(54) LOCATING DEVICES

(71) Applicant: Biz2mobile Ltd, Abingdon (GB)

(72) Inventor: Anton Jakob Flugge, Oxford (GB)

(73) Assignee: BIZ2MOBILE LTD, Abingdon (GB)

(*) Notice: Subject to any disclaimer, the term of this patent is extended or adjusted under 35 U.S.C. 154(b) by 0 days.

(21) Appl. No.: 17/597,367

(22) PCT Filed: Jul. 15, 2020

(86) PCT No.: PCT/GB2020/051702
§ 371 (c)(1),
(2) Date: Jan. 4, 2022

(87) PCT Pub. No.: WO2021/019205
PCT Pub. Date: Feb. 4, 2021

(65) Prior Publication Data
US 2022/0210758 A1 Jun. 30, 2022

(30) Foreign Application Priority Data
Jul. 31, 2019 (GB) .................................. 1910890

(51) Int. Cl.
*H04W 64/00* (2009.01)
(52) U.S. Cl.
CPC .................. *H04W 64/00* (2013.01)
(58) Field of Classification Search
CPC . H04W 64/00; H04W 64/003; H04W 64/006; H04W 68/00
See application file for complete search history.

(56) References Cited

U.S. PATENT DOCUMENTS

| 2008/0147882 A1* | 6/2008 | Reif | H04W 8/183 |
| | | | 709/238 |
| 2012/0134272 A1* | 5/2012 | Vempati | H04L 43/10 |
| | | | 370/241 |

(Continued)

FOREIGN PATENT DOCUMENTS

JP    2011-205703 A    10/2011

OTHER PUBLICATIONS

International Search Report for corresponding International Application No. PCT/GB2020/051702 dated Oct. 21, 2020.

(Continued)

*Primary Examiner* — Umair Ahsan
(74) *Attorney, Agent, or Firm* — Pearne & Gordon LLP

(57) ABSTRACT

A method for determining the location of mobile devices, comprising providing at least one mobile device and at least two access points distributed over two or more locations; noting the identity of access points the device is connected to over time; noting transitions between access points a device is connected to and identifying two or more access points as belonging to the same location if the mobile device transitions between connecting to said access points within a certain time period; allocating a first location to a group of access points to which a device transitions within said certain period of time and a second or further location to access points to which a device does not transition to from the first set of access points within said certain period of time; thereby associating groups of one or more access points with one or more locations, and determining the location of the device when it is subsequently connected to one of the located access points.

10 Claims, 2 Drawing Sheets

(56) References Cited

U.S. PATENT DOCUMENTS

| | | | |
|---|---|---|---|
| 2014/0045536 A1* | 2/2014 | Sydir | H04W 4/021 455/456.5 |
| 2015/0264536 A1 | 9/2015 | Patil et al. | |
| 2016/0150374 A1 | 5/2016 | Venkatraman et al. | |
| 2017/0074972 A1 | 3/2017 | Do et al. | |

OTHER PUBLICATIONS

Written Opinion for corresponding International Application No. PCT/GB2020/051702 dated Oct. 21, 2020.
UKIPO Combined Search and Examination Report for related application GB1910890.1 dated Aug. 2, 2021.

* cited by examiner

LOCATING DEVICES

FIELD OF THE INVENTION

This invention relates to locating mobile devices.

BACKGROUND OF THE INVENTION

When a workforce or group of people are issued with mobile devices it is important to avoid or reduce the chance of devices getting lost, stolen or drifting between different locations. Many users of such devices may have a home location that they generally work at or in the vicinity of. A means for alerting when devices leave their home location, in a timely manner, is desirable. The reason may be that the user deliberately, whether authorised or unauthorised, removes the device from the home location, that the device may have been stolen, or that the device may have been unintentionally shipped outside of the home location, for example if dropped into a customer shipment accidentally. Making sure that devices are in their intended location allows the enterprise to run their operations with less buffer stock and therefore to operate more efficiently.

Such mobile devices are often connected by wireless networking such as Wi-Fi to local wireless access points.

Devices might not have a GPS location as GPS might be turned off or may not be available at an indoor location.

Additional methods to determine if a device is at the expected location are therefore required. In most indoors locations devices will be connected to a wireless data network via wireless access points which can be uniquely identified by their ID, eg their BSSID. If an operator knows the location of each access point and to which access point a device is connected, they can determine an approximate location of a device. If they detect that a device is connected to an unknown access point or to a known access point at a different location an alert can be generated accordingly.

Many businesses and other operators of groups of mobile devices which can connect to a plurality of access points do not record the location of each of the access points and thereby are unable to determine a device's location even if the device can report which access point it is connected to at a particular time.

BRIEF SUMMARY OF THE INVENTION

The present invention arose in attempt to provide an improved system for determining the location of mobile devices and alerting if they are not at the home or other specified location.

According to the present invention there is provided a method for determining the location of mobile devices, comprising providing at least one mobile device and at least two access points distributed over two or more locations; noting the identity of access points at least one of the devices is connected to over time; noting transitions between access points one of the at least one devices is connected to and identifying two or more access points as belonging to the same location if said mobile device transitions between access points within a certain time period; allocating a first location to a group of access points to which one of the least one devices transitions within said certain period of time and a second or further location to access points to which one of the at least one devices does not transition to from the first set of access points within said certain period of time; thereby associating groups of one or more access points with one or more locations, and determining the location of one of the at least one devices when it is subsequently connected to one of the located access points.

Thus, by using embodiments of the invention, the location of access points can be determined without pre-knowledge of this, and the location of devices connected to an access point can therefore be determined.

Preferably the system includes a means for alerting an operator if a device is not in a desired, or home, location, comprising determining the list of access points and their associated locations, noting a home location for that device and alerting when the device connects to an access point which is not at said location. Most preferably a list of access points and locations is continually updated and data is discarded after a certain period of time, thereby keeping the system refreshed and up to date. This enables changes in the location of access points to be provided for automatically.

The invention further provides a system for performing a method as detailed above comprising providing at least one mobile device; and a plurality of access points distributed over more than one location, each device being initially associated with a home location, and further providing a server and a transient memory means.

The invention further provides a method for determining the location of mobile devices, comprising providing at least one mobile device and at least two access points distributed over two or more locations; noting the identity of access points the device is connected to over time; noting transitions between access points a device is connected to and identifying two or more access points as belonging to the same location if the mobile device transitions between connecting to said access points within a certain time period; allocating a first location to a group of access points to which a device transitions within said certain period of time and a second or further location to access points to which a device does not transition to from the first set of access points within said certain period of time; thereby associating groups of one or more access points with one or more locations, and determining the location of the device when it is subsequently connected to one of the located access points.

BRIEF DESCRIPTION OF THE DRAWINGS

Embodiments of the invention will now be described, by way of example only, with reference to the accompanying schematic drawings in which.

DESCRIPTION OF EXAMPLE EMBODIMENTS

Figure 1:
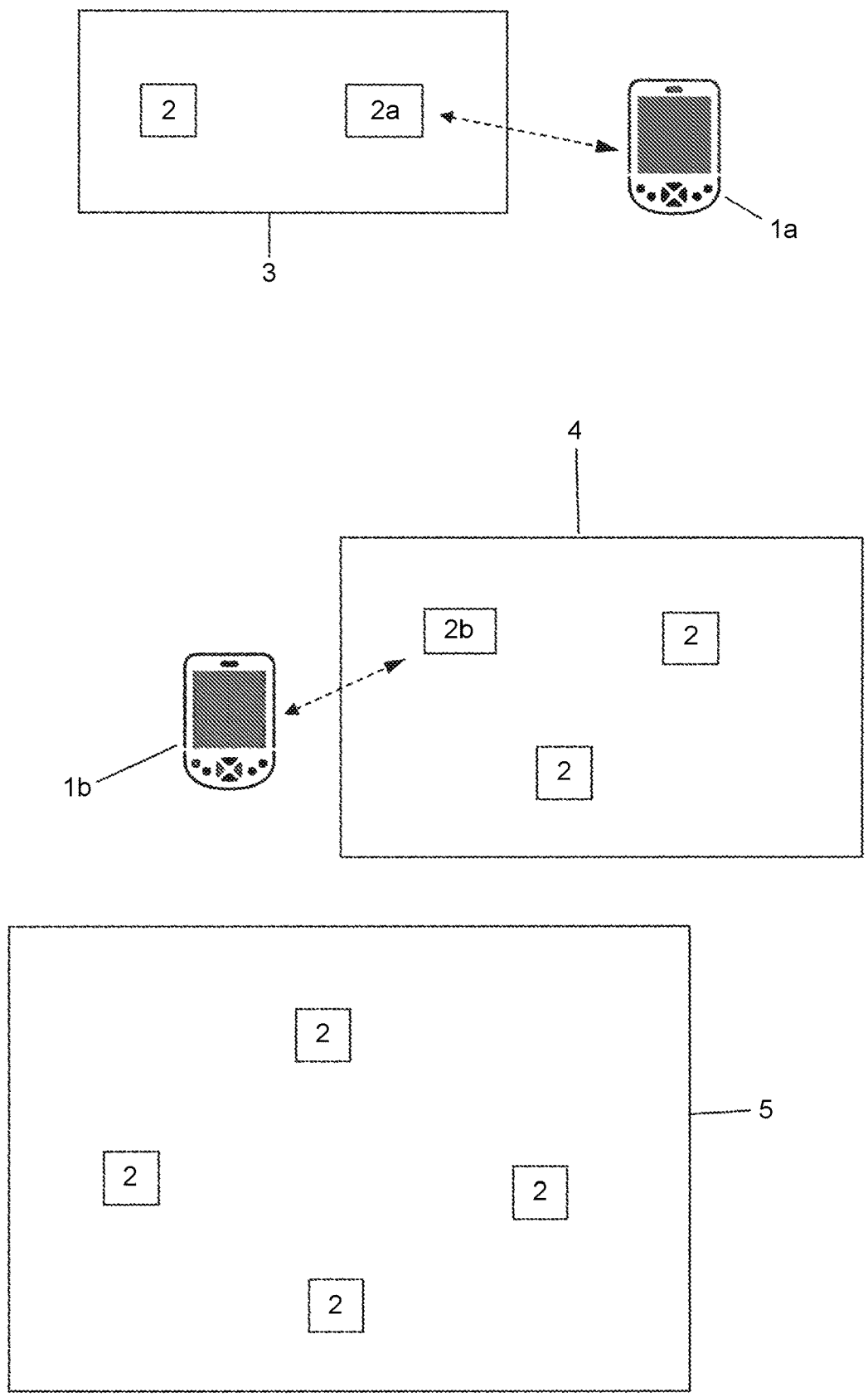
FIG. 1 shows a communication system where a number of mobile devices are connected to a number of access points at three different locations.

Referring to FIG. 1, a communication system comprises a plurality of mobile devices 1 which can communicate wirelessly, eg by Wi-Fi, with any of a number of access points 2. Such Wi-Fi access points are well known. The Wi-Fi points 2 are distributed over a series of Locations 3, 4 and 5. Thus, Location 3 which may, for example, be a Head Office of a company, includes two access points, Location 4 may be a sub-office, eg the "Reading Office", that comprises three access points and Location 5, which might be another sub-office such as the "Oxford Office", may comprise four access points. Each device may have a home location allocated to it. Thus both mobile devices may be initially associated with Location 3 "Head Office" as this home location. The pre-association may be done manually by an operator of the system. The association is stored in the device and/or in a remote server.

Of course, the system may work with just one mobile device in scenarios where a user of the device travels between locations.

In practice, many more access points than shown may be included at each location and the number may vary widely. Each mobile device 1 can connect to any of the access points at any of the locations and will generally connect to the closest access point to it. Thus, at one point in time mobile device 1 is connected to access point 2a at Location 3, and mobile device 1b is connected to access point 2b in Location 4.

Figure 2:
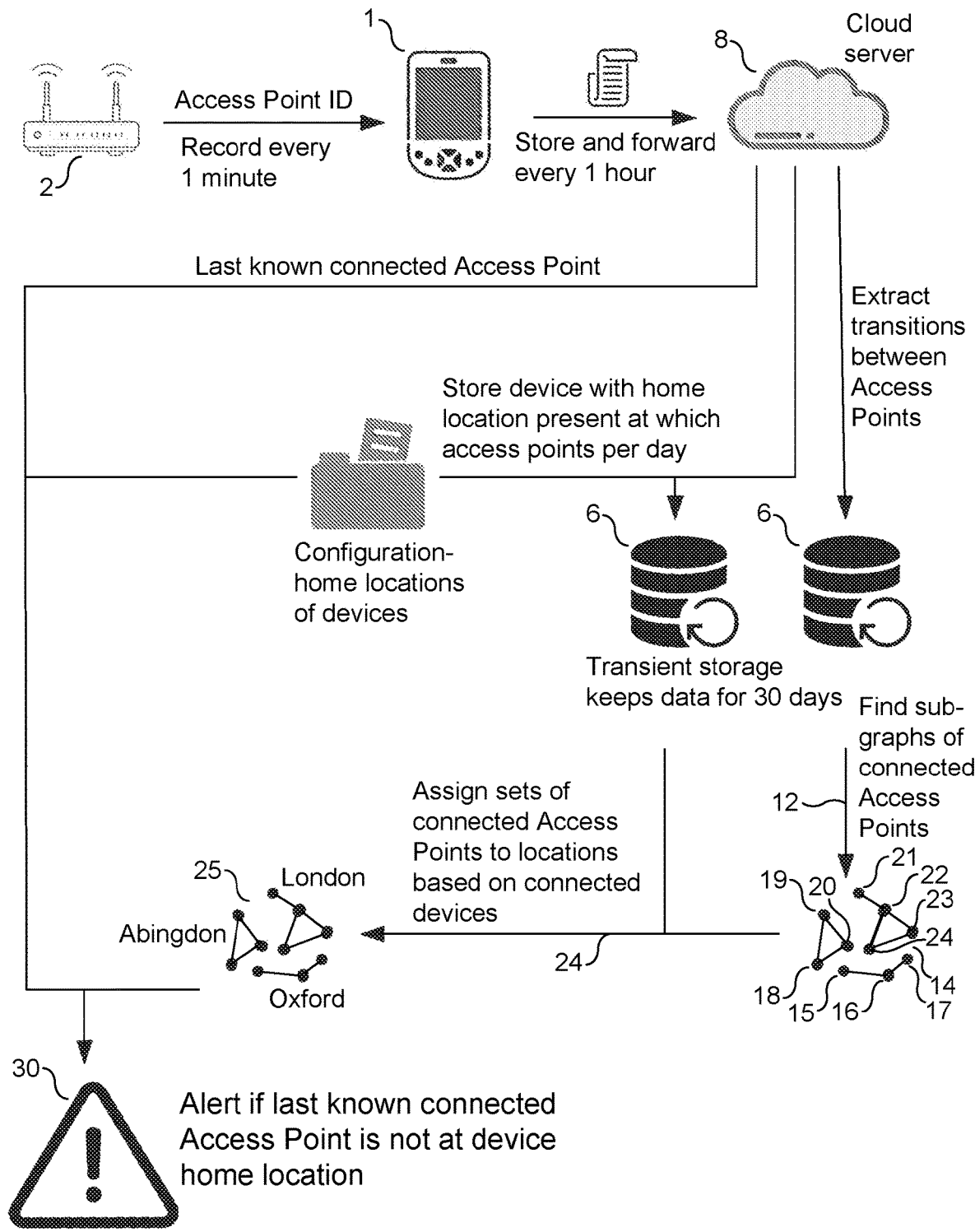
FIG. 2 shows a system for associating access points with locations and alerting if a device is not at a device home location.

However, it may well be that the operator of the system does not know that access point 2a belongs to location 3 and access point 2b belongs to location 4. FIG. 2 shows a system for determining if the access point a device is connected to belongs to the home location of the device. Of course, an operator may be able to provide a list of all the access points 2, and to which location they belong to. However, in practice this is not done and since a system might have a very complex configuration involving many access points connected in many different ways, it is not generally possible to obtain, in a real-world situation, an accurate list of access points and their locations.

In the system of FIG. 2, there is provided a remote server 8, typically configured as a cloud server, which may comprise a single server or a number of servers over the cloud, and a transient storage means (memory means) 6, which can also be provided in the cloud.

At a broad level, the system works as follows:

As is known, when a mobile device connects to an access point the details of the access point, including the access point ID (eg BSSID), are known and can be determined. The various locations 3 to 5, for example of FIG. 1, can, in embodiments of the invention, be given defining information. For example the location may be given an identity or ID, a name (eg "Oxford Office"), a latitude/longitude (or other geographical position identifier) and a radius or extent over which it has effect.

In embodiments of the invention a client or app is provided on each device.

The client regularly samples which access point each device 1 is connected to at any time. If a device switches from one access point to another within a certain amount of time then it is evident that the two access points must be physically close to each other. By switching, it is meant either that there is an instantaneous (or near instantaneous) switch from one access point to another without substantial drop in connectivity, or that the device loses contact with one access point then regains contact with another access point within a certain time period. This time period may vary with circumstances but in one example may be five minutes. It may be greater or less than this.

By recording such transitions between access points a graph model of the access points that devices connect to can be built up, with the access points as nodes in the graph model. If the device is switched between those access points within the certain time period (eg five minutes) then the nodes (eg each node representing an access point) may be connected in the graph. If, on the other hand, a device is connected to an access point then loses connection with this and only connects to another access point after the fixed period (eg two hours later) then it is likely that the device has travelled some distance and thus that the second access point is not in the same location.

Thus, a graph model may be built up which comprises various sub-graphs whereby the access points in one location are linked to each other by edges but no edges connect them to the access points of other locations. In this way, access points belonging to the same location can be determined. This is described in more detail below.

If the assumption is then made that most devices tend to be at their assigned home location, the system can then determine which location such a cluster of connected access points belongs to by analysing home locations of the devices connected to those access points. The use of sub-graphs of connected access points rather than simply of individual access points related to a location makes for a more reliable system and also overcomes issues such as some access points only rarely being connected to devices or only to a few individual devices.

Referring now to FIG. 2, the system is shown in more detail. The process will normally be able to be split into four distinct steps.

Step (a): Data capture; Step (b): Determining sets of connected access points; Step (c): Determining the location of sets of access points and; Step (d): Alerting when devices are found not to be at their home location. Any one or more of these Steps may be used, Step (a)

Referring to FIG. 2, the system client on each device 1 samples the Wi-Fi access point 2 a device is connected to, preferably at a relatively high frequency (such as once a minute).

This information regarding the Wi-Fi access points the device is connected to is recorded on the device and also sent by the client or app 10 to the cloud server 8 at regular intervals (eg once an hour). The server acts to process reports of connected access points and detects transitions between access points. As described, a transition is detected if the device switches from being connected to one access point to another within a set time and in one embodiment this set time may be five minutes as described above.

These transitions are stored in a transient storage means (6) which again will generally be in the cloud or remotely situated on the internet. The information stored at the transient data storage may include identifiers for the two access points which a device transitions between, and the time of the transition. The identifiers may of course be the BSSID of the access point. In embodiments, this information is stored for a certain period of time, such as for a filling period of thirty days, before being deleted. The time period may of course be varied. In this way, the information is continually updated to account for changes in configuration, new access points being added, access points being removed and so on.

In addition, for each access point the device was connected to, the system may store information such as the device ID, the home location of the device, the access point ID and the date, also for a temporary period.

Step (b)

The second step comprises determining sets of connected access points. Based on the data on transitions between access points in the transient storage, a regular process (eg once per hour) computes the sub-sets of connected access points in a set 12 to derive sub-graphs, such as graph 14, which shows a point connected into groups. Thus, nodes 15, 16 and 17 (each associated with particular access points) are connected but these are not connected to other nodes. Nodes 18, 19 and 20 are also connected to each other in a separate group. Thus, a first group of nodes includes nodes (access points) 15, 16 and 17 and the second group comprises nodes 18, 19 and 20. A third group comprises nodes 21, 22, 23 and 24.

In a modification a thresholding method could be used if data quality is poor. In such an optional thresholding method a connection between access points might be confirmed only if reported multiple times. For example, it has been reported five times. Often this threshold step will not be needed, however.

Step (c)

In a third step, locations are assigned to sets of access points. The system may use various steps to achieve this, for each of the sets of connected access points which have been determined. Thus, it may be done for the first set 15, 16 and 17 and also for the second set 18, 19 and 20 and so on. For each particular set of access points, the data regarding devices which have connected to them is read from the transient storage means 6.

For each particular home location the system can count how many devices which have been pre-assigned to that home location connected per day (for example) to each access point in the set.

For each set of access points the system can then check if more than a set threshold of the reported access point connections per device per day are for devices assigned to the same home location. This threshold may be, for example, fifty percent. The system may also check whether a number of unique devices (for example three devices) with the same given home location have connected to an access point in this set. If that is the case then the "home location" becomes a candidate location for that particular set of access points.

As defined, a location can be defined by giving a location an ID, a name, a physical address (eg latitude/longitude) and a radius or some measure of its extent.

This enables a device to be assigned to a location.

Further steps in the step of assigning locations to the sets of access points are as follows.

If any one particular set of access points becomes a candidate location for a given home location then that home location will (in one embodiment of the invention) be set as the location for the set of access points. Note that each location is labelled.

If there are, however, multiple sets of access points that are candidate locations for the same home locations, then a rule to distinguish between these may be used. One particular rule might be that the set of access points with the highest number of reported device-day-access point connections is assigned that location, which is a reasonable rule to use for most circumstances. Other rules may be used.

In an optional process, an additional set of access points corresponding to a location which is not the dominant candidate location for a certain location (eg home location) could also be assigned to the same location if necessary. This may potentially be based on additional thresholds. This could be used to set sub-locations within a main location for example.

Thus, by using rules such as those above, the sets of connected access points are specifically linked or assigned to locations in a graph model 25. In this case, a first group (comprising access points 15, 16 and 17) are assigned to the location "Oxford" and the second group (access points 18, 19 and 20) is assigned to the location "Abingdon". The third group is assigned to "London".

In the assigned embodiments of the invention, it may be sufficient to simply report the location of devices and their location history.

However, in many embodiments it is also useful to be able to alert when devices are not in their home location, as in Step (d) below.

Step (d)

After the system has learnt which location a particular access point belongs to, then, when the device subsequently reports that it has connected to an access point which is not in its home location (or other desired location) an alert can be created as step 30. The alert may be generated on a web-dashboard of a user, via email or other message system by and/or some other means of directly alerting a system operator. The server and/or device may be arranged to generate this alert.

Different levels of alert may be generated. In one example there are three different levels of alert, although there may be more or less than this. There may be just one level of alert. In a three level system the levels of alert may be as follows, in one embodiment:

A—when a device connects to an access point in a known location (that is part of the user's network/premises) that is not its home location. For example if a device's home location is at the Head Office, then an alert is generated if the device is used at (ie connects to an access point) the "Oxford" Office.

B—when a device connects to an access point that is not in any known location (and is therefore presumably outside the ownership or known locations of the operators of the device); and C—when a device is not connected to any access point or has not been connected to an access point for a set length of time. This might imply the device has been lost, or is no longer being used in which case it can be removed from an inventory, for example.

By continually updating the data and having data deleted after a certain period of time, the system is kept updated and changes in access point provision or location is automatically allowed for.

The invention claimed is:

1. A method for determining a location of at least one of a plurality of mobile devices, comprising providing at least one mobile device of the plurality of mobile devices and at least two access points distributed over two or more locations;

noting identities of access points said at least one of mobile device is connected to over time; noting transitions between access points said at least one mobile device is connected to and identifying two or more access points as belonging to a same location if said at least one mobile device transitions between said access points within a first certain time period;

allocating a first location to a group of access points to which said at least one mobile device transitions within said first certain period and a second or further location to access points to which said at least one mobile device does not transition from a set of access points within said first certain time period;

thereby associating groups of one or more access points with one or more locations, and determining the location of said at least one mobile device when it is subsequently connected to one of the located access points, and providing a server and a memory such that the identities of access points to which said at least one mobile device is connected is transmitted to the server and whereby the server is arranged to extract transitions between access points and to store the extracted transitions in the memory to thereby determine whether two or more access points belong to the same location or not, wherein the server determines groups of access points which are considered to be in the same location, and associates each of the groups with a certain location identity, wherein the method for associating the groups of access points with location identities comprises the following steps;

(a) for each of the set of access points at a particular location, identifying the at least one mobile device which is connected to the set of access points over the first certain time period;

(b) pre-associating one of home locations to the at least one mobile device, and determining a number of said plurality of mobile devices associated with a particular one of the home locations which is connected in the first certain time period to each of the access points at the location;

(c) determining whether a majority and/or more than a threshold of the mobile devices which are connected to access points in a particular location are devices pre-associated with that location; and (d) determining if more than a set number of the mobile devices which are associated with the particular home location have connected to a set of access points in the location and, if so, setting that location as a candidate for an allocated home location.

2. The method as claimed in claim 1, comprising associating each of the plurality of mobile devices with one of the locations as a home location and determining, when one of the plurality of mobile devices is connected to an access point, whether that device is at its home location or not.

3. The method as claimed in claim 2, comprising generating an alert if one of the plurality of mobile devices is connected to an access point which is not associated with its home location.

4. The method as claimed in claim 1, wherein the memory is a transient memory which is continually updated to store information regarding access points and transitions for only a second certain time period and then to delete it.

5. The method as claimed in claim 1, wherein if more than one group of access points, and therefore locations, are considered to be a candidate for the allocated home location, then a rule is used to decide which of these locations is most likely to be the home location, the rule being that the set of access points with the highest number of reported connections from the at least one mobile device with the candidate location as the allocated home location to access points at the location within a time period is considered to be the home location.

6. The method as claimed in claim 1, wherein the threshold is 50%.

7. The method as claimed in claim 1, comprising associating more than one group of connected access points to the same location.

8. The method as claimed in claim 1, comprising generating an alert if one of the plurality of mobile devices is found to be connected to an access point which is not at its home location; there being a plurality of levels of alert depending upon the nature of the connection; the levels of alert being as follows:

(a) if said at least one mobile device is connected to an access point in a known location that is not its home location;

(b) if said at least one mobile device is connected to an access point that is not in any known location, and which is therefore an access point which has not been allocated to a location, and;

(c) if one of the plurality of mobile devices is not connected to any access point or is not connected to an access point for a set time length.

9. The method as claimed in claim 1, wherein the at least one mobile device comprises at least two mobile devices.

10. A system for performing the method as claimed claim 1, comprising said plurality of mobile devices and said plurality of access points distributed over more than one location, each of the plurality of mobile devices being initially associated with one of the home locations.

* * * * *